United States Patent

Kubota

[15] 3,655,909

[45] Apr. 11, 1972

[54] COLOR TELEVISION CAMERA

[72] Inventor: Yasuharu Kubota, Kanagawa-ken, Japan

[73] Assignee: Sony Corporation, Tokyo, Japan

[22] Filed: Oct. 20, 1970

[21] Appl. No.: 82,460

[30] Foreign Application Priority Data

Oct. 21, 1969 Japan....................................44/84102

[52] U.S. Cl...........................................................178/5.4 ST

[51] Int. Cl...........................................................H04n 9/06

[58] Field of Search..............................................178/5.4 ST

[56] References Cited

UNITED STATES PATENTS

| | | | |
|---|---|---|---|
| 2,579,971 | 12/1951 | Schade | 178/5.4 ST |
| 2,827,512 | 3/1958 | Stahl et al. | 178/5.4 ST |

*Primary Examiner*—Richard Murray
*Attorney*—Lewis H. Eslinger, Alvin Sanderbrand and Curtis, Morris & Safford

[57] ABSTRACT

A color television camera includes an image pickup tube having a scanning surface to convert an image of an object projected thereon through a color filter into a signal and two light sources projecting a red light and a cyan light alternatively on the scanning surface through the color filter to provide an index signal of alternately changing phase in the composite signal constituting the output of the tube.

6 Claims, 13 Drawing Figures

YASUHARU KUBOTA

Patented April 11, 1972 3,655,909

4 Sheets-Sheet 1

INVENTOR.
YASUHARU KUBOTA

BY

INVENTOR.
YASUHARU KUBOTA

INVENTOR
YASUHARU KUBOTA

INVENTOR
YASUHARU KUBOTA

COLOR TELEVISION CAMERA

BACKGROUND OF THE INVENTION

1. Field of the Invention

The present invention relates to a color television camera, and more particularly to a color television camera with a single image pickup tube.

2. Description of the Prior Art

There have been proposed a number of color television cameras which generate a color video signal by projecting on a scanning surface of an image pickup tube a color-separated image of an object to be televised and an index image consisting of a dark and light pattern superposed on the color-separated image.

A general drawback of such color television cameras is that it is necessary to provide a difference between the frequency band of the index signal from the bands of the chrominance signal and the luminance signal and hence it is required to narrow down the band of the chrominance signal or the luminance signal, with the result that it is almost impossible to reproduce a color picture with high resolution. Further it is also impossible to separate the index signal and video signal from the output signal of the prior art color television camera, and thus deteriorates the reproduced picture due to the fact that one signal is mixed into the other signal.

In prior art cameras, the filter for producing an index image formed integral with a color-separation filter or is formed independent from the color-separation filter to optically superimpose, or overlap the images of both filters on the scanning surface of the image pickup tube. In the former case, that is, when the index image-forming and color-separation filters are portions of one filter, the utilization rate of light projected onto the filter is lowered to the extent that the area of the filter is occupied by the index filter, with the result that the sensitivity and resolution of the camera are lowered, while in the latter case it is necessary to adjust the independent index filter and color-separation filter in such a manner that the images of both the filters are formed with a predetermined overlapped relation and further it is also necessary to make the filters with high pattern accuracy, so that the device is costly.

SUMMARY OF THE INVENTION

An object of the present invention is to provide a color television camera free from the above drawbacks encountered in the prior art.

Another object of the present invention is to provide a color television camera which has, for example, two light sources for index signal generation. During the vertical blanking periods, complementary color lights, for example, red light and cyan light, are projected alternately onto the scanning surface of an image pickup tube through the color-separation filters, whereby images of the predetermined patterns of the color filters are overlapped on the scanning surface with the color-separated image of an object to be televised. Since the images of the patterns produced by the two light sources are in complementary color relation with each other, a composite electric signal of an index signal and a color video signal with different waveforms is obtained from the camera during the successive vertical scanning periods. Since the index signal is generated by means of the same color filter and is used for producing a chrominance signal, the index signal and the chrominance signal have the same frequency band to prevent the drawback of the conventional device from occurring. Accordingly, the present invention provides a color television camera which is simple in construction, requires no adjustment and further increases the resolution as much as possible.

In order to separate the composite signal into the index signal and the chrominance or color video signal, the composite signal passed through a band-pass filter is applied to a delay circuit for delaying the composite signal by a time corresponding to one vertical period. The output of the delay circuit and the composite signal (not delayed) are added together to generate the chrominance signal, and the delayed composite signal and that signal without delay are subtracted to produce the index signal.

DESCRIPTION OF THE PREFERRED EMBODIMENTS

Figure 1:
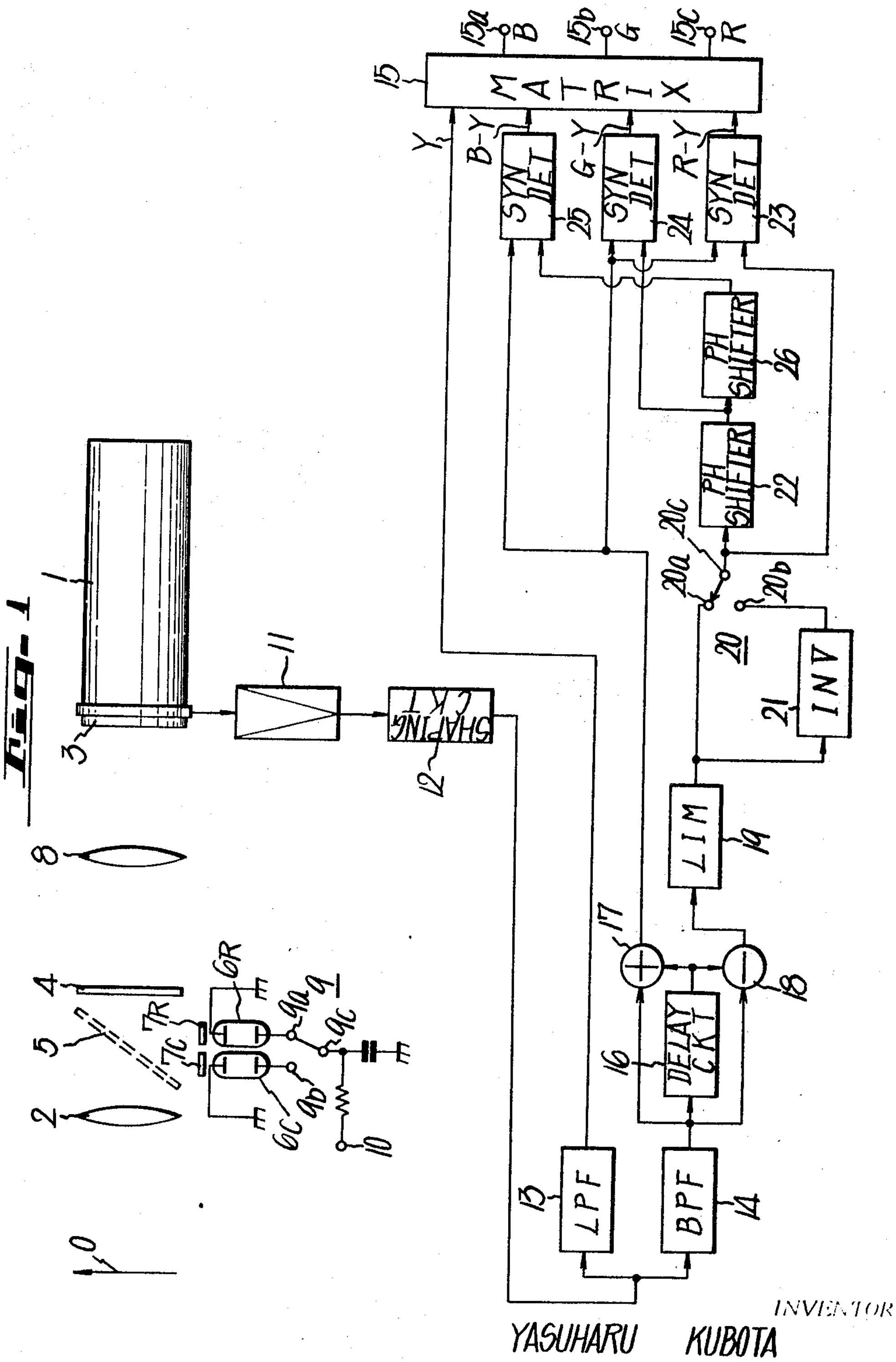
FIG. 1 is a schematic diagram illustrating one embodiment of a color image pickup tube (color television camera) according to the present invention.
Figure 2:
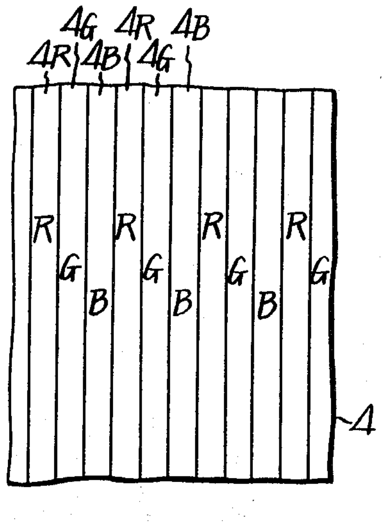
FIG. 2 is a schematic diagram showing an example of a color filter used in the camera according to the present invention.

In FIG. 1 reference numeral 0 indicates an object to be televised, 1 is an image pickup tube, for example, a vidicon for generating an ordinary black-and-white television signal, 2 is a pickup lens disposed in front of the scanning surface 3 of the image pickup tube 1, that is, in front of the photoelectric conversion surface thereof, and 4 is a color filter positioned between the pickup lens 2 and the scanning surface 3. The color filter 4 (FIG. 2) consists of a plurality of red strip filter elements 4R, a plurality of green strip filter elements 4G and a plurality of blue strip filter elements 4B. In the filter 4 as shown, the color strip filter elements 4R, 4G and 4B are vertically arranged in a predetermined order in parallel with one another. Between the pickup lens 2 and the color filter 4 there is disposed a half mirror 5 in a plane at about 45° with respect to the plane of the color filter 4. Two xenon discharge tubes 6R and 6C are disposed in such a manner that rays of light from the xenon discharge tubes 6R and 6C intersect the reflection plane of the half-mirror 5 at about 45 degrees and further so that the discharge tubes 6R and 6C do not interfere with the light passed through the pickup lens 2. A red color filter 7R is interposed between one xenon discharge tube 6R and the half-mirror 5 and a cyan color filter 7C is interposed between the other xenon discharge tube 6C and the half-mirror 5. The light emitted from the object 0 is projected onto the scanning surface 3 of the image pickup tube 1 through the pickup lens 2, the half mirror 5, the color filter 4 and a relay lens 8. The lights radiated from the xenon discharge tubes 6R and 6C passes respectively through the red and cyan color filters 7R and 7C to be filtered as red light and cyan light and the red light and cyan light is reflected by the half mirror 5 and then led to the scanning surface 3 of the image pickup tube 1 through the color filter 4 and the relay lens 8. One electrode of each of the xenon discharge tubes 6R and 6C is grounded while the other electrodes thereof are respectively connected to fixed contacts *9a* and *9b* of a switch 9. A movable contact *9c* of the switch 9 is connected to ground through a capacitor and also to a terminal 10 of a DC power source through a resistor. The movable contact 9c of the switch 9 is switched from one to the other of the fixed contacts *9a* and *9b* in synchronism with the vertical synchronizing signal. Thus, the xenon discharge tubes 6R and 6C are alternately lit within the vertical blanking period. With such an arrangement electric charge images corresponding to the red strip filters 4R or electric charge images corresponding to the green and blue strip filters 4G and 4B are alternately formed on the photo-electric conversion surface 3 of the image pickup tube 1 in response to energizing of the xenon discharge tubes 6R and 6C, respectively. Thereafter the color-separated electric charge image of the object O is formed on surface 3 in overlapping relation to the image of red strip filters 4R or the image of green and blue strip filters 4G and 4B. Thus, at the output terminal of the image pickup tube 1 there is obtained a color video signal which is alternately superposed upon a signal due to red bias light or a signal due to cyan bias light.

Figures 3A, 3B, 3C, 3D:
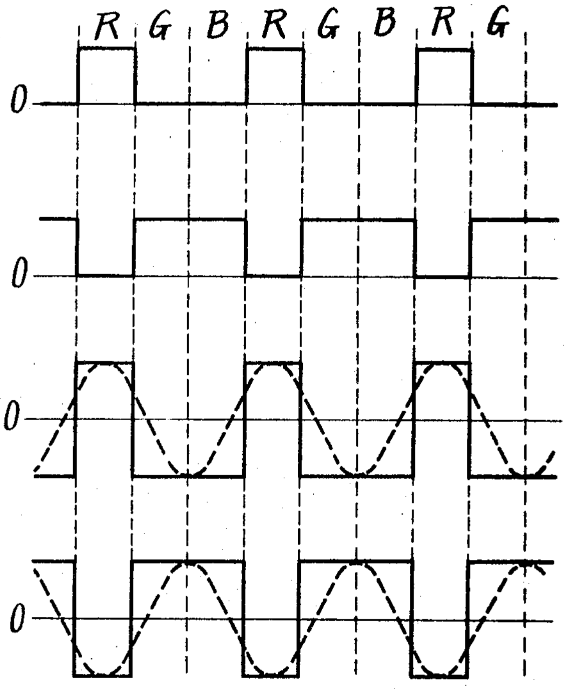
FIGS. 3A to 3D, inclusive, are waveform diagrams for explaining the present invention.

A red color bias signal shown in FIG. 3A is superposed on the video signals of the odd number fields, while a cyan color bias signal as shown in FIG. 3B is superposed on the even number field video signals. The output signal from the image pickup tube 1 is supplied through a pre-amplifier 11 and a shaping circuit 12 to a low-pass filter 13 capable of passing therethrough a luminance signal and also to a band-pass filter 14 capable of passing therethrough a chrominance signal. The output of the low-pass filter 13 is applied to a color demodulation matrix circuit 15, while the output of the band-pass filter 14 is supplied to a delay circuit 16 for delaying the output by one vertical period, for example, one-sixtieth second, and also to an adder circuit 17 and a subtracter circuit 18. The output of the delay circuit 16 is applied to the adder circuit 17 and the subtracter circuit 18 respectively. Consequently, the chrominance signal superposed on the odd number field red color bias signals and the chrominance signal superposed on the even number field cyan color bias signals are added to each other in the adder circuit 17. In the embodiment being described, as is apparent from FIGS. 3A and 3B, the red color bias signal and the cyan color bias signal are opposite in phase and hence the bias light signals cancel each other, so that only the chrominance signal is obtained from the adder circuit 17. On the other hand, in the subtractor circuit 18, an odd number field chrominance signal and an even number field signal are subtracted, so that the chrominance signal is canceled from the output of circuit 18. However, since the light bias signals of the odd and even number field signals are opposite in phase as shown in FIGS. 3A and 3B, a first index signal shown in FIG. 3C is obtained in the odd number fields, while a second index signal the phase of which is opposite to that of the first index signal, namely different from that of the first index signal by 180°, is obtained as shown in FIG. 3D. In this case, since the red color bias light signal shown in FIG. 3A and the cyan color bias light signal shown in FIG. 3B pass through the band-pass filter 14, the high-frequency and low-frequency components thereof are eliminated. Accordingly, first and second sine-wave index signals, represented by dotted lines in FIGS. 3C and 3D, are provided as the output of the subtracter circuit 18. Such first and second index signals are applied to a limiter amplifier 19 for making constant the amplitudes thereof. The output side of the limiter amplifier 19 is connected directly to a fixed contact 20*a* of a switch 20 and through a phase inverter circuit 21 to another fixed contact 20*b* of the switch 20. A movable contact 20*c* of the switch 20 is alternately connected to the fixed contacts 20*a* and 20*b* during successive vertical periods. In this case it may be preferred to couple the movable contact 20*c* of the switch 20 to the movable contact 9*c* of the switch 9. Thus, an index signal which is made by causing the first index signal to agree in phase with the second index signal is obtained at the movable contact 20*c* of the switch 20. The index signal obtained at the movable contact 20*c* is applied to a synchronous detector circuit or demodulator 23 and to a phase shifter circuit 22. The output of the phase shifter circuit 22 is applied to another phase shifter circuit 26 and to another synchronous detector or demodulator circuit 24. The output of the phase shifter circuit 26 is applied to a synchronous detector or demodulator 25. The synchronous detector circuits 23, 24 and 25 also receive the output of the adder circuit 17 (the chrominance signal). From the synchronous detector circuits 23,24 and 25, color differential signals (R–Y), (G–Y) and (B–Y) are respectively obtained and are applied to a matrix circuit 15. Thus, B (blue), G (green) and R (red) signals are provided at output terminal 15*a*, 15*b* and 15*c*, respectively of the matrix circuit 15.

Figure 4:
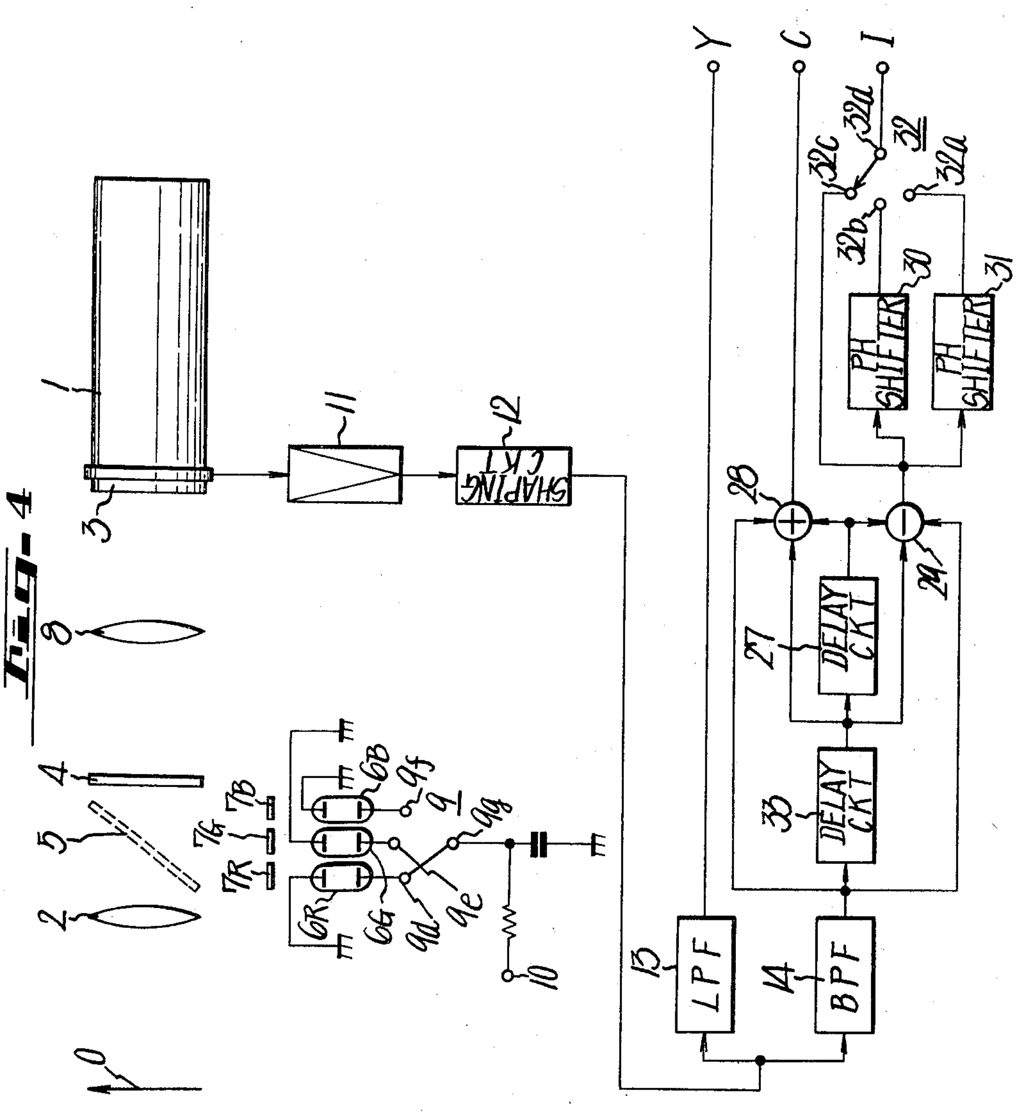
FIG. 4 is a schematic diagram illustrating another modification of the present invention.

FIG. 4 shows another example of the present invention in which similar reference numerals similar to those of FIG. 1 represent the same elements, which will not be described again. In this example three xenon discharge tubes 6R, 6G and 6B are provided and the lights therefrom are led to the photoelectric conversion face 3 of the image pickup tube 1 through a red color filter 7R, a green color filter 7G and a blue color filter 7B as the primary colors. One of electrode of each of xenon discharge tubes 6R, 6G and 6B is connected to ground while the other electrodes thereof are connected to the fixed contacts 9*d*, 9*e* and 9*f*, respectively, of the switch 9. The movable contact 9*g* of the switch 9 is sequentially engaged with the fixed contacts 9*d*, 9*e* and 9*f* to apply voltage to the xenon discharge tubes 6R, 6G and 6B in successive vertical blanking periods, whereby the xenon discharge tubes emit light.

Figures 5A, 5B, 5C, 5D, 5E, 5F:
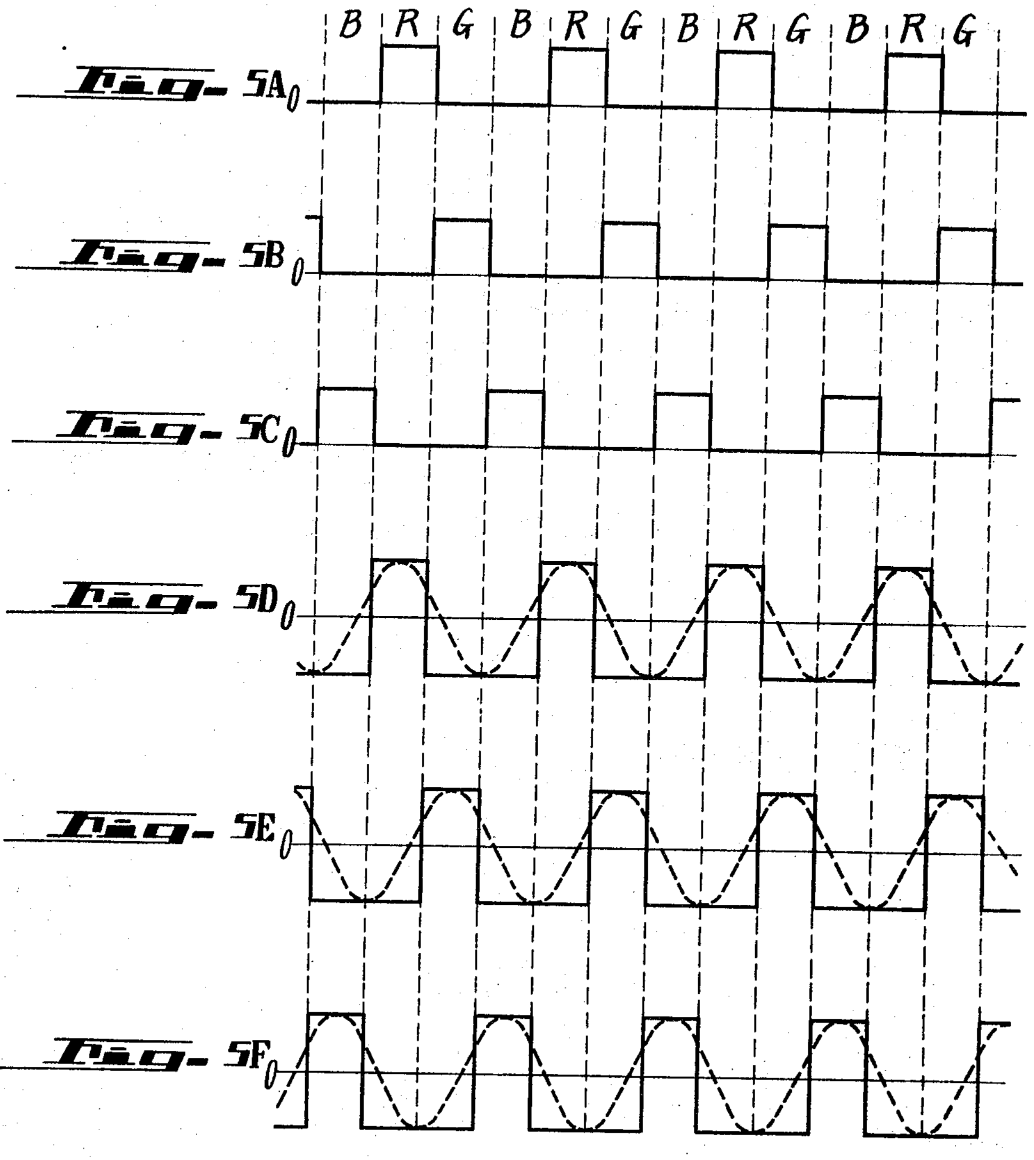
FIG. 5A to 5F, inclusive, are waveform diagrams for explaining the operation of the example depicted in FIG. 4.

With such an arrangement, an index signal shown in FIG. 5A is superposed on a color video signal corresponding to the image of the object 0 to be televised in the output from the image pickup tube 1 during the time period of one field following lighting of the xenon discharge tube 6R. Similarly, a signal shown in FIG. 5B and a signal shown in FIG. 5C are respectively superposed on the color video signals corresponding to the image of the object 0 in the output from the image pickup tube 1 during the time period of one field following lighting of the xenon discharge tube 6G and the time period of one field following lighting of the xenon discharge tube 6B. The composite signal of the chrominance signal and the index signal obtained by applying the output of the image pickup tube 1 to the band-pass filter 14 through the pre-amplifier circuit 11 and the shaping circuit 12 is supplied to a delay circuit 33 for delaying the signal by one field, an adder circuit 28 and a subtracter circuit 29 respectively. The output of the delay circuit 33 is respectively applied to the adder circuit 28, the subtracter circuit 29 and a delay circuit 27 for delaying the signal by one field. The output of the delay circuit 27 is applied to the adder circuit 28 and the subtracter circuit 29 respectively. The index signals shown in FIGS. 5A, 5B and 5C are all added in the adder circuit 28, so that the index signals are canceled and only the chrominance signal C is derived from the adder circuit 28. The output of subtracter circuit 29 provides the signals shown in FIGS. 5D, 5E and 5F for every field and such output is supplied to a fixed contact 32*c* of a switch 32, a phase shifter 30 for shifting the phase of the signal by 120° and a phase shifter 31 for shifting the phase of the signal by 240°. Since the signals passed through the band-pass filter 14, the practical signals are fundamental components of sine-waves such as are shown in dotted lines in FIGS. 5D, 5E and 5F. The output sides of the phase shifters 30 and 31 are connected to fixed contacts 32*b* and 32*a* of the switch 32. A movable contact 32*d* of the switch 32 is changed over at every field in synchronism with, for example, the switch 9 for operating the xenon discharge tubes, so that the signals shown in FIGS. 5D, 5E and 5F are converted into a desired index signal I with a predetermined phase and which appears at the movable contact 32*d*.

Accordingly, it will be apparent that if synchronous detector circuits and a matrix circuit (not shown) similar to those indicated at 22–26 and 15 on FIG. 1 are added to the circuit of FIG. 4, color video signals of three colors R, G and B may be obtained.

In each of the foregoing examples, the video signal is alternately superposed on different color light bias signals at every vertical period. However, the video signal may be alternately superposed with different color bias signals at every horizontal period, and in that case the horizontal period is selected to be the delay time of the delay circuit with effects similar to those of the foregoing examples.

In the foregoing examples color filters with three primary colors R, G and B are employed but color filters with, for example, R, G and cyan colors may be employed instead thereof with a similar result.

It may also be possible to combine a color filter and a lens screen composed of a number of lenticular lenses to form means for producing the color-separated image.

Further, it may be possible to use a solid state array image sensor employing a semiconductor device with a number of PN junctions as an image pickup tube.

It will be apparent that many modifications and variations may be effected without departing from the scope of the novel concepts of this invention.

I claim as my invention

1. A color television camera for generating an electrical signal corresponding to an object to be televised in the field of view of said camera, said camera comprising a scanning surface adapted to convert light projected thereon into an electrical output, filter means disposed between said object and said scanning surface and adopted to form on said scanning surface color separated image of said object, and means for projecting light of alternately complementary colors through said filter onto said scanning surface to form on said scanning surface an index image in overlapping relation with said color separated image.

2. A color television camera as claimed in claim 1 in which there is provided a means for projecting said light onto said scanning surface during blanking periods.

3. A color television camera as claimed in claim 1 in which a circuit means is provided for generating a composite electrical signal consisting of an index signal and a color video signal from said scanning surface.

4. A color television camera as claimed in claim 1 in which the color of said light projected onto said scanning surface is changed at every surface scanning period.

5. A color television camera as claimed in claim 3 further further comprising at least one delay circuit for delaying said composite electrical signal and an adder circuit for adding the output of said delay circuit and said composite electrical signal to produce a color video signal.

6. A color television camera as claimed in claim 3 further comprising at least one delay circuit for delaying said composite electrical signal, and a subtracter circuit for producing an index signal by providing a difference signal from said composite electrical signal and the output of said delay circuit.

* * * * *